United States Patent
Ushani et al.

(10) Patent No.: US 10,788,585 B2
(45) Date of Patent: Sep. 29, 2020

(54) SYSTEM AND METHOD FOR OBJECT DETECTION USING A PROBABILISTIC OBSERVATION MODEL

(71) Applicant: Toyota Research Institute, Inc., Los Altos, CA (US)

(72) Inventors: Arash K. Ushani, Ann Arbor, MI (US); Jeffrey M. Walls, Ann Arbor, MI (US); Ryan W. Wolcott, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 318 days.

(21) Appl. No.: 15/905,099

(22) Filed: Feb. 26, 2018

(65) Prior Publication Data
US 2019/0086549 A1    Mar. 21, 2019

Related U.S. Application Data

(60) Provisional application No. 62/558,896, filed on Sep. 15, 2017.

(51) Int. Cl.
| | | |
|---|---|---|
| G01S 17/00 | (2020.01) | |
| G01S 17/931 | (2020.01) | |
| G01S 17/42 | (2006.01) | |
| G01B 11/24 | (2006.01) | |
| G05D 1/00 | (2006.01) | |
| G05D 1/02 | (2020.01) | |
| G01S 7/481 | (2006.01) | |

(52) U.S. Cl.
CPC ............ *G01S 17/931* (2020.01); *G01B 11/24* (2013.01); *G01S 7/4817* (2013.01); *G01S 17/42* (2013.01); *G05D 1/0088* (2013.01); *G05D 1/024* (2013.01); *G05D 1/0214* (2013.01); *G05D 2201/0213* (2013.01)

(58) Field of Classification Search
None
See application file for complete search history.

(56) References Cited

U.S. PATENT DOCUMENTS

| | | |
|---|---|---|
| 7,003,136 B1 | 2/2006 | Harville |
| 9,120,462 B2 | 9/2015 | Jonsson et al. |
| | (Continued) | |

OTHER PUBLICATIONS

Dominic Zeng Wang and Ingmar Posner. Voting for voting in online point cloud object detection. Proceedings of Robotics: Science and Systems, Rome, Italy, 2015.

*Primary Examiner* — Blake A Tankersley
(74) *Attorney, Agent, or Firm* — Christopher G. Darrow; Darrow Mustafa PC (57) ABSTRACT

System, methods, and other embodiments described herein relate to predicting a presence of occluded objects from a robotic device. In one embodiment, a method includes, in response to acquiring sensor data about a surrounding environment, analyzing the sensor data to identify a perceived object in the surrounding environment by determining at least a class of the perceived object. The method includes determining a presence factor associated with the perceived object according to an observation model. The presence factor indicates a likelihood of an occluded object existing in an occluded region associated with the perceived object. The method includes controlling one or more systems of the robotic device according to the presence factor.

20 Claims, 6 Drawing Sheets

(56) References Cited

U.S. PATENT DOCUMENTS

| | | |
|---|---|---|
| 9,336,602 B1 | 5/2016 | Chang et al. |
| 9,483,839 B1 | 11/2016 | Kwon et al. |
| 9,619,691 B2 | 4/2017 | Pang et al. |
| 2016/0054452 A1 | 2/2016 | Cosatto et al. |
| 2017/0220874 A1 | 10/2017 | Ayvaci et al. |
| 2018/0259967 A1* | 9/2018 | Frazzoli .............. B60W 30/143 |
| 2018/0314921 A1* | 11/2018 | Mercep ................ G01S 13/862 |

* cited by examiner

SYSTEM AND METHOD FOR OBJECT DETECTION USING A PROBABILISTIC OBSERVATION MODEL

CROSS-REFERENCE TO RELATED APPLICATIONS

This application claims benefit of U.S. Provisional Application No. 62/558,896, filed on, Sep. 15, 2017, which is herein incorporated by reference in its entirety.

TECHNICAL FIELD

The subject matter described herein relates in general to a system and method for detecting objects in a surrounding environment and, more particularly, to predicting the presence of occluded objects within the surrounding environment according to at least characteristics of an occluded region.

BACKGROUND

Robotic devices such as vehicles can be equipped with sensors that facilitate perceiving obstacles, pedestrians, and additional aspects of a surrounding environment. Perception and reasoning by the devices (e.g., autonomous/semi-autonomous vehicles) allow the devices to make decisions according to the perceived objects/obstacles. However, the sensors can provide an incomplete view of the surrounding environment. For example, a light detection and ranging (LIDAR) sensor uses light/lasers to scan the surrounding environment from a point of view of the LIDAR which results in detected objects occluding a view of other objects that may be positioned behind the detected objects. Thus, as the vehicle/robot moves through an environment and uses the LIDAR sensor to scan, the occluded objects can be undetected. Moreover, dynamic objects can become occluded as they move through the environment further complicating detection and tracking of such objects. Accordingly, perceiving aspects of a surrounding environment can encounter difficulties when objects are occluded from a point of view of provided sensors.

SUMMARY

In one embodiment, example systems and methods relate to a manner of predicting the presence of occluded objects using a probabilistic observation model. Accordingly, the presently disclosed systems and methods leverage, for example, the idea of unknown (occluded) space for determining or, assigning a probability to, the existence of an object (e.g., a vehicle) that is located in the occluded space. In one embodiment, an object detection system acquires sensor data about a surrounding environment and analyzes the sensor data in order to detect objects in the surrounding environment. Thus, the object detection system or another system to which the information is provided can, for example, localize a vehicle, perceive aspects of the environment for path planning, perform obstacle avoidance, and so on using the acquired sensor data.

Accordingly, as part of acquiring the sensor data and perceiving aspects of the surrounding environment, the object detection system determines a presence factor associated with each perceived object. That is, for example, the presence factor indicates a likelihood of an occluded object, such as a vehicle, existing within an occluded region associated with a perceived object. Consider that the perceived objects cause occurrences of occluded regions that result from "shadows" cast behind the perceived objects and which are obscured from perception by the sensors. Moreover, the various perceived objects cause various sizes/profiles of occlusions (i.e., occluded regions) resulting from observation of the perceived object. These various occluded regions can obscure different types of objects depending on size, shape, and so on.

Thus, the object detection system can assign different probabilities to perceived objects within the environment according to probabilistic observation models associated therewith. As such, observation models associated with different perceived objects can have an associated size, dimensions, profile, and so on. From this information, the object detection system can determine a size of an occlusion that results from observing the perceived object. In one embodiment, the object detection system determines a probability of an occluded object (e.g., a vehicle) being present in the occluded region based, at least in part, on a size of the occluded region cast by the perceived object. Accordingly, the object detection system generates the presence factor as the likelihood that a particular object or class of object is present within the occluded region. In this way, the object detection improves situational awareness about objects or probabilities of objects being present within the surrounding environment and can thus also improve path planning, collision avoidance, and other aspects relating to navigation through the environment.

In one embodiment, an object detection system for predicting a presence of occluded objects from a robotic device is disclosed. The object detection system includes one or more processors and a memory communicably coupled to the one or more processors. The memory storing a monitoring module including instructions that when executed by the one or more processors cause the one or more processors to, in response to acquiring sensor data about a surrounding environment, analyze the sensor data to identify a perceived object in the surrounding environment by determining at least a class of the perceived object. The memory further storing a detection module including instructions that when executed by the one or more processors cause the one or more processors to determine a presence factor associated with the perceived object according to an observation model, wherein the presence factor indicates a likelihood of an occluded object existing in an occluded region associated with the perceived object. The detection module includes instructions to control one or more systems of the robotic device according to the presence factor.

In one embodiment, a non-transitory computer-readable medium for predicting a presence of occluded objects from a robotic device is disclosed. The non-transitory computer-readable medium includes instructions that when executed by one or more processors cause the one or more processors to perform one or more functions. The instructions include instructions to, in response to acquiring sensor data about a surrounding environment, analyze the sensor data to identify a perceived object in the surrounding environment by determining at least a class of the perceived object. The instructions include instructions to determine a presence factor associated with the perceived object according to an observation model. The presence factor indicates a likelihood of an occluded object existing in an occluded region associated with the perceived object. The instructions include instructions to control one or more systems of the robotic device according to the presence factor.

In one embodiment, a method for predicting a presence of occluded objects from a robotic device is disclosed. The method includes predicting a presence of occluded objects from a robotic device. In one embodiment, a method includes, in response to acquiring sensor data about a surrounding environment, analyzing the sensor data to identify a perceived object in the surrounding environment by determining at least a class of the perceived object. The method includes determining a presence factor associated with the perceived object according to an observation model. The presence factor indicates a likelihood of an occluded object existing in an occluded region associated with the perceived object. The method includes controlling one or more systems of the robotic device according to the presence factor.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with detecting objects and determining the presence of objects in occluded areas are disclosed. As mentioned previously, robotic devices such as autonomous vehicles plan a path through an environment according to surrounding obstacles and the roadway. In general, an autonomous vehicle achieves this planning by using sensors to detect the obstacles and other aspects of the environment. However, various difficulties can complicate the noted detection and planning. For example, when the sensors do not perceive one or more objects because of occlusions in the environment an incomplete perception of the environment is then used to execute navigation and obstacle avoidance. That is, the autonomous vehicle, may not be aware of all possible obstacles/objects within an environment because of occlusions from detected objects.

Therefore, in one embodiment, an object detection system employs observation models associated with various types/classes of objects in order to determine a probability of whether the different types/classes of objects are present within occluded regions. As a preliminary note, while described herein as being implemented within an autonomous vehicle, the object detection system can be implemented in further machine vision applications, such as robotics, security, tracking, etc. In either case, the object detection system is generally implemented within a vehicle or other robotic device that also includes or is in communication with a sensor (e.g., LIDAR) that scans a surrounding environment.

Accordingly, as part of acquiring the sensor data and perceiving aspects of the surrounding environment, the object detection system determines a presence factor associated with each perceived object. For example, the presence factor indicates a likelihood of an occluded object, such as a vehicle, existing within an occluded region associated with a perceived object. Because the perceived objects cast "shadows," which are areas obscured from perception by the sensors, the occluded objects can go undetected. Moreover, the various perceived objects cause various sizes/profiles of occlusions (i.e., occluded regions) resulting from observation of the perceived object. These various occluded regions can obscure different types of objects depending on size, shape, and so on.

Thus, the object detection system uses the sensor data about the perceived objects to, in one embodiment, classify the perceived objects according to at least a type and extrapolate therefrom information about the occluded region cast by the perceived object. For example, the object detection system can use the class of the perceived object as an input into the observation model. The object detection system uses the observation model in combination with the class to identify aspects of the occluded region such as shape, size, profile, etc.

Thereafter, the object detection system assigns different probabilities according to the occluded regions that specify a probability of an occluded object (e.g., a vehicle) being present in the occluded region. Accordingly, the object detection system generates the presence factor as the likelihood that a particular object or class of object (e.g., vehicle, pedestrian, bicycle, etc.) is present within the occluded region. In this way, the object detection improves path planning, collision avoidance, and other aspects relating to awareness of objects in the surrounding environment.

Prior to discussing particular embodiments of the presently disclosed systems and methods, an initial overview of the disclosed concepts will be provided. Consider a set of observations (e.g., LIDAR observations) $Z=\{z_i\}^n_{i=1}$, which are acquired by the object detection system where each z represents a ray, voxel, or other data element at angle $\theta_i$ with range $r_i$.

$$p(obj_c|Z), \quad (1)$$

$obj_c$ represents a perceived object of class c that exists at some position (x, y) within the surrounding environment and at some angle $\theta_{object}$ in relation to a point of observation (e.g., from a vehicle). For purposes of explanation, stars and boxes of variable size will be discussed as the perceived and/or occluded objects. Additionally, a model $p(obj_{no\ obj}\cdot Z)$, of the probability that no object exists at (x, y) is used. Accordingly, using Bayes' rule and assuming conditionally independent observations given the object:

$$p(obj_c|Z) = \frac{p(Z|obj_c)p(obj_c)}{p(Z)}. \quad (2)$$

-continued $$= \frac{p(obj_c) \prod_{i=1}^{n} p(z_i \mid obj_c)}{p(Z)}. \quad (3)$$

Taking the log probability provides:

$$\log p(obj_c \mid Z) = \log \eta + \sum_{i=1}^{n} \log p(z_i \mid obj_c) + \log p(obj_c), \quad (4)$$

where $\eta = \frac{1}{p(z)}$ is a normalization constant.

Additionally, consider $p(z_i \mid obj_c)$ and assume that $\theta_i$ is known, and thus the noted system models $p(r_i \mid obj_c, \theta_i)$ by, for example, implementing a lookup table of histograms from simulated data or collected data labeled with ground truth objects within the object detection system.

In general, a number of simulated environments with objects placed in random positions and orientations can be used to generate the histograms. Thereafter, the object detection system can generate simulated LIDAR data. The system takes each $z_i$ generated. Additionally, the system can project rays into a frame of the object. The system computes the relative angle between the ray and the object, $\varphi = \theta_i - \theta_{object}$. The system also computes a closest distance between the ray and the center of the object location, $d_{ray}$. Finally, the system computes $d_{obs}$, the position of the range $r_i$ along the ray, relative to the closest point along the ray to the object center. This is given by:

$$\varphi = \theta_i - \theta_{object}, \quad (5)$$

$$d_{ray} = x \sin \theta_i - y \cos \theta_i, \quad (6)$$

$$d_{obs} = r_i - x \cos \theta_i - y \sin \theta_i. \quad (7)$$

Thus, $(\omega, d_{ray})$ parameterizes the ray for the $z_i$ that is being considered, and $d_{obs}$ represents the observation, relative to the location of the object. (Note that these can be positive or negative). Thus:

$$p(r_i \mid obj_c, \theta_i) = p_{obj_c}(d_{obs} \mid \varphi, d_{ray}). \quad (8)$$

Maintaining a two-dimensional array (e.g., lookup table) of histograms, parameterized by $(\varphi, d_{ray})$ and building the observation model, for each $z_i$, the object detection system determines the histograms and updates with $d_{obs}$. Visualizing the result of these histograms by querying the log probability of a potential LIDAR observation given an object of a certain class with a certain state. Thus equation (4) becomes:

$$\log p(obj_c \mid Z) = \log \eta + \sum_{i=1}^{n} \log p_{obj_c}(d_{obs} \mid \phi, d_{ray}) + \log p(obj_c), \quad (9)$$

Assume that at any given location (x, y), there can only be one object across all classes (including the no object class) and orientations:

$$\sum_{class\ c, orientation\ \theta_{object}} p(obj_c \mid Z) = 1 \quad (10)$$

Thus, computing log η and then p(objc|Z) for all classes and orientations. Recall that equation (3) assumed conditionally independent observations given the object (namely, its position and class):

$$p(Z \mid obj_c) = \prod_{i=1}^{n} p(z_i \mid obj_c). \quad (11)$$

Consider intra-class variation of objects. A star object might not always have the same size. In this case, one observation might capture some of this variation, and thus be informative for the next observation. For example, if a LIDAR observation is closer, that might indicate that the object is on the large size, and thus the next observation is likely to be close as well. In one approach, an approximation (e.g., Chow-Liu tree) is implemented. Alternatively, the system captures the full distribution p(Z objc). Creating a "2-gram" model:

$$p(Z \mid obj_c) = \left( \prod_{i=2}^{n} p(z_i \mid obj_c, z_{i-1}) \right) p(z_1 \mid obj_c), \quad (12)$$

where each observation depends, for example, on a directly preceding observation (note that with this terminology, reference to the previous model is made as the "1-gram" model). In one embodiment, the object detection system builds a map that represents the probability that an object of a particular class exists at any particular position (x, y) and orientation θ: p(object of class c at (x, y) and orientation θ|Z). This is the local map. To build this map for every class c, position (x, y) and θ, the object detection system computes the map using, for example, the 2-grams.

To build the observation model, the object detection system, in one embodiment, populates histograms according to generated LIDAR scans of multiple environments over time. Subsequently, the object detection system generates a LIDAR scan from a previously unseen environment with multiple objects. The object detection system can then analyze the LIDAR sensor data of the surrounding environment using the previously generated observation model. In this way, the object detection system learns aspects relating to various configurations of occluded regions and predicts the presence of occluded objects in a surrounding environment by generating the noted presence factors from the generated observation model. Further aspects of the particular implementations of the object detection system will now be discussed.

Figure 1:
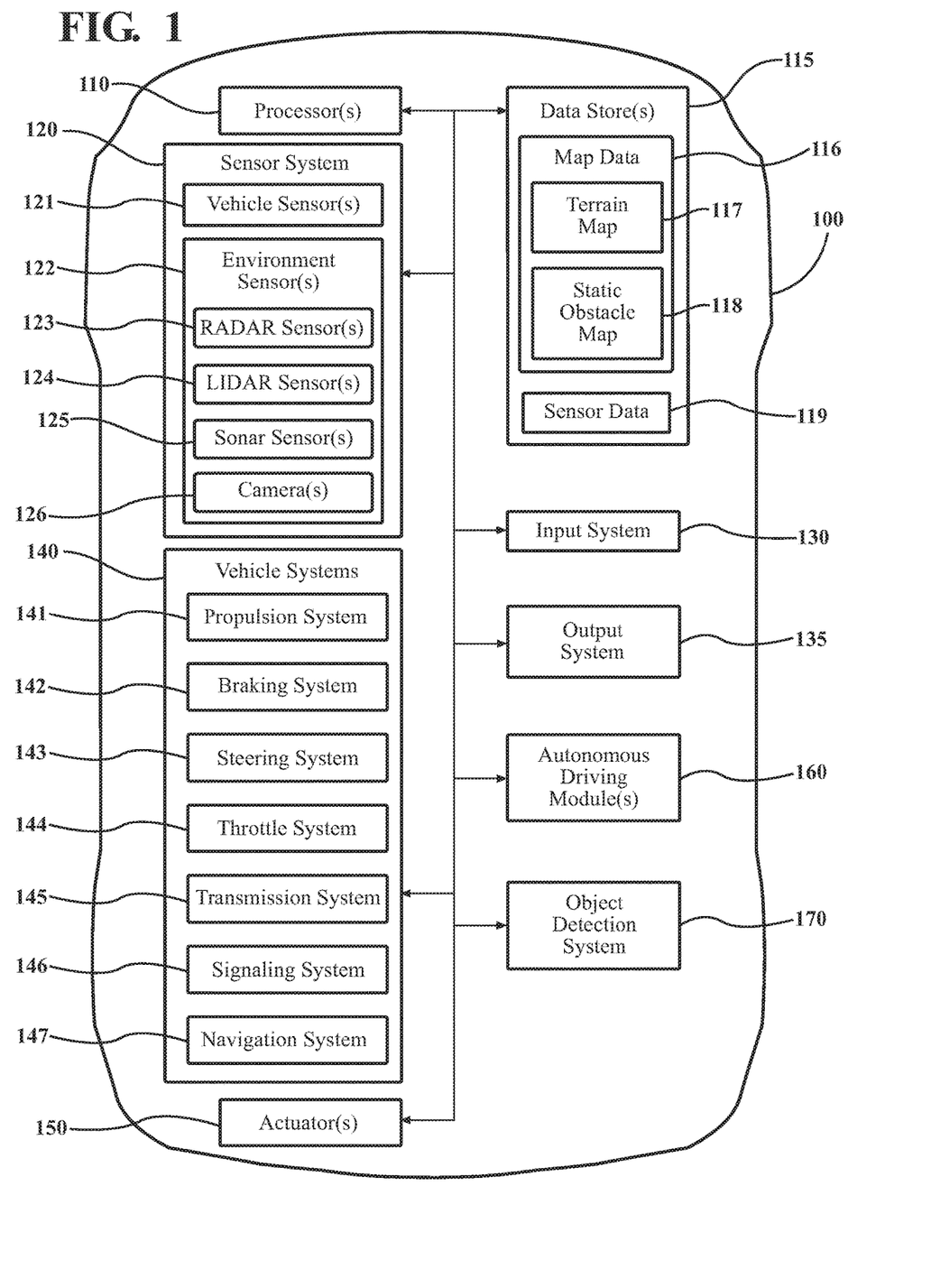
FIG. 1 illustrates one embodiment of a vehicle within which systems and methods disclosed herein may be implemented.

Referring to FIG. 1, an example of the vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, can operate/navigate at least semi-autonomously and/or can indicate contextual information to an operator/driver, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes an object detection system 170 that is implemented to perform methods and other functions as disclosed herein relating to predicting the presence of occluded objects in relation to perceived objects. The noted functions and methods will become more apparent with a further discussion of the figures.

Figure 2:
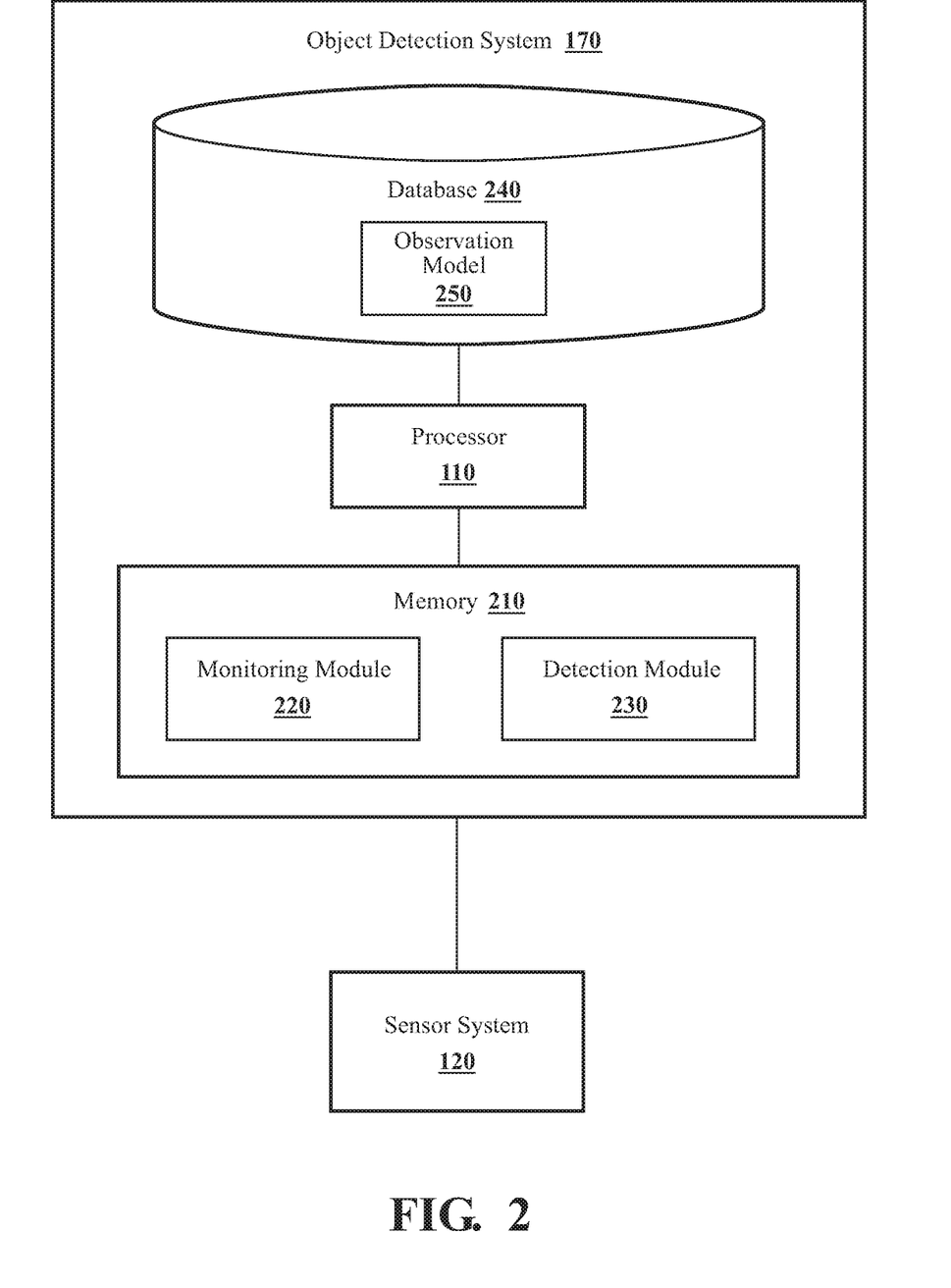
FIG. 2 illustrates one embodiment of an object detection system that is associated with predicting whether occluded objects are present.

With reference to FIG. 2, one embodiment of the object detection system 170 of FIG. 1 is further illustrated. The object detection system 170 is shown as including a processor 110 from the vehicle 100 of FIG. 1. Accordingly, the processor 110 may be a part of the object detection system 170, the object detection system 170 may include a separate processor from the processor 110 of the vehicle 100, or the object detection system 170 may access the processor 110 through a data bus or another communication path. In one embodiment, the object detection system 170 includes a memory 210 that stores a monitoring module 220 and a detection module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the monitoring module 220 generally includes instructions that function to control the processor 110 to receive data inputs from one or more sensors of the vehicle 100. The inputs are sensor data collected from one or more sensors of the sensor system 120. In general, the sensor data is, in one embodiment, observations of one or more objects in a surrounding environment proximate to the vehicle 100 and/or other aspects about the surroundings. Consequently, the monitoring module 220, in one embodiment, analyzes the sensor data to detect surrounding vehicles/objects and, for example, generate tracks or other information about the objects/vehicles. The tracks are, for example, trajectories that include present velocities, positions, and headings for the object as determined from the respective sensor inputs.

In either case, the monitoring module 220 analyzes the sensor data to identify perceived objects (i.e., objects embodied within the sensor data). In one embodiment, the monitoring module 220 identifies a class of a perceived object. That is, the monitoring module 220 generally determines whether the perceived object is a car, pedestrian, motorcycle, barrel, sign post, and so on. Accordingly, in various implementations, the monitoring module 220 outputs the noted determination of a class for the perceived object along with, for example, a location relative to the vehicle 100. In further embodiments, the monitoring module 220 can generate a 3D representation of the perceived object, however, as discussed herein, the monitoring module 220 generally indicates a class.

Moreover, in one embodiment, the object detection system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data (e.g., sensor data) used by the modules 220 and 230 in executing various functions. In one embodiment, the database 240 includes the observation model 250 along with, for example, sensor data and or other information that is used by the modules 220 and 230. For example, the database 240 can include location coordinates (e.g., longitude and latitude), relative map coordinates, time/date stamps from when the separate sensor data was generated, and so on.

Moreover, the observation model 250 may include various data structures storing learned information about objects (e.g., vehicles, pedestrians, etc.) that is used to formulate estimations of whether objects exist within occluded regions. Moreover, the observation model 250 includes, in one embodiment, information regarding poses, sizes, relative shapes of occluded regions cast by objects, histograms of parameters associated with different classes/types of objects, and so on. In one embodiment, the observation model 250 is implemented as a lookup table that is referenced according to, for example, at least a type/class of a perceived object in order to determine aspects relating to an occluded region cast by the perceived object. Additionally, in further embodiments, the database 240 and/or the memory 210 store the observation model 250 in various portions.

In one embodiment, the detection module 230 generally includes instructions that function to control the processor 110 to predict a presence of occluded objects in occluded regions. Moreover, while the observation model 250 is discussed as being stored in the database 240, in one or more embodiments, the observation model 250 is at least partially integrated with the detection module 230. That is, for example, a portion (e.g., index) of the observation model 250 can be implemented within the detection module 230 and executed on the processor 110 while the noted data structures may be stored in the database 240 and/or in the memory 210. In either case, the detection module 230 implements the observation model 250 to predict the existence of objects within occluded regions.

In one embodiment, the detection module 230 is configured in a manner so as to predict the presence of occluded objects according to at least perceived objects and relative occluded regions cast by the perceived objects. Thus, the detection module 230, in one embodiment, generates a presence factor for separate occluded regions that indicates a likelihood of the presence of the occluded object(s) of a particular class (e.g., vehicle). Additionally, the object detection system 170 provides the presence factor to additional aspects of the vehicle 100 such as the autonomous driving module 160. In further aspects, the object detection system 170 controls aspects of the vehicle 100 directly such as controlling the vehicle 100 to execute an emergency maneuver (e.g., pullover) and/or to render visual display alerts or audible alerts to occupants of the vehicle 100. In this way, the object detection system improves the operation of the vehicle 100 by improving detection of potentially occluded objects and thus also improves planning and execution of maneuvers, improving the operation of one or more computers through more efficient planning, improving safety through better awareness of the presence of possible objects, and so on.

Figure 3:
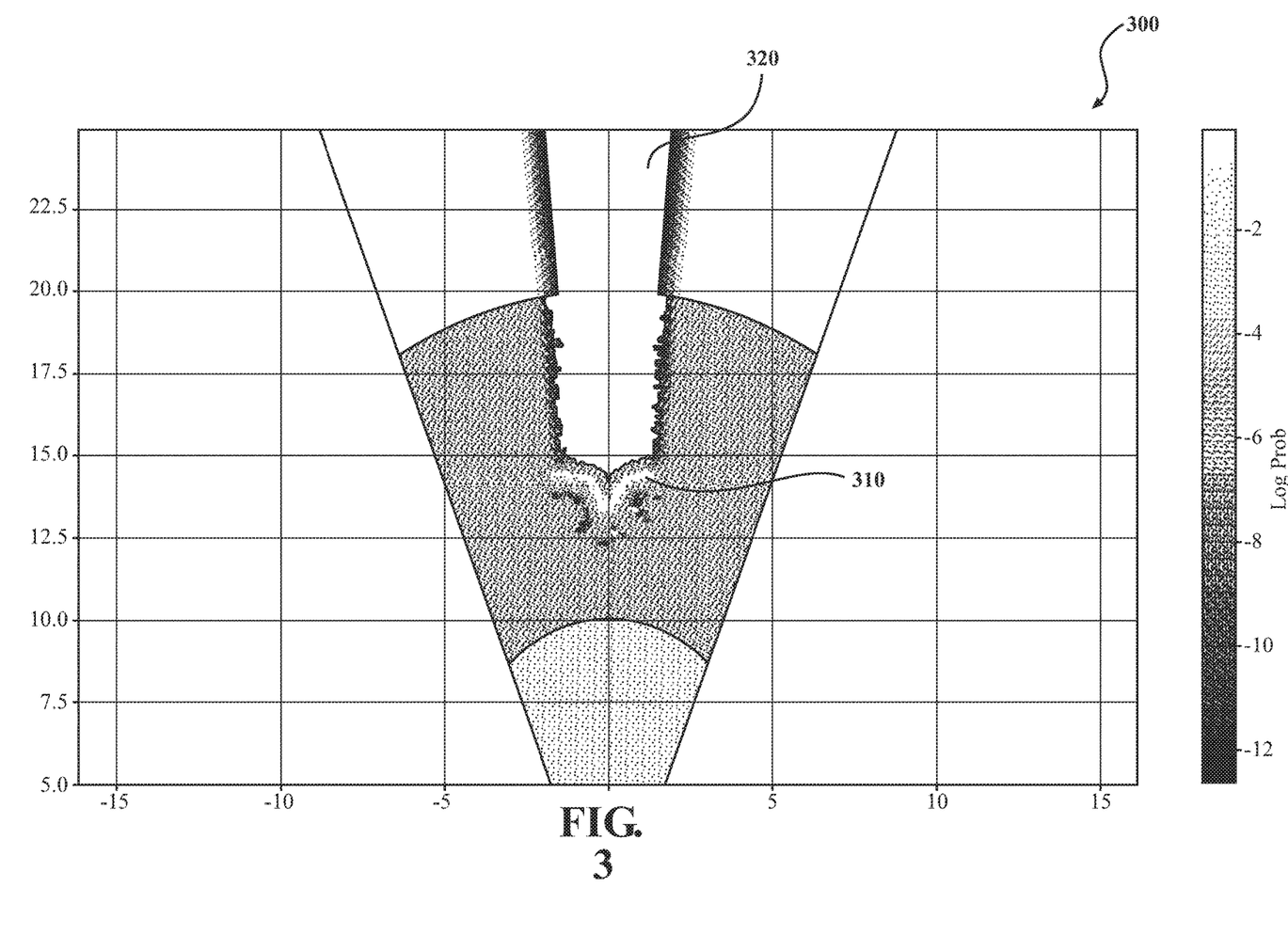
FIGS. 3-4 illustrate LIDAR observation models that generally indicate forms of occluded regions for a particular object.

By way of example, consider FIG. 3 which generally illustrates an example of an observation model 300 for a star-shaped object 310 as perceived by a LIDAR sensor such as the LIDAR sensor 124. It should be appreciated that the model 300 is generally illustrative of how a LIDAR sensor perceives an object in two-dimensions and, in further aspects, histograms/models of the observation model 250 may include further dimensions. Thus, the model 300 is shown from a top-down perspective. Accordingly, the star-shaped object 310 generally has a top-down profile that is in the form of a star. For purposes of this discussion, remaining portions of the star-shaped object in a dimension into/out of the paper should be considered to be consistent with the general profile as illustrated. In either case, the model 300 of the perceived star-shaped object 310 illustrates how the object 310 casts an occluded region 320. Moreover, it should be appreciated that depending on a particular distance of the LIDAR sensor 124, size of the object 310, and angle in relation to the object 310, the precise dimensions of the occluded region 320 may be adjusted. However, whichever orientation that is determined, the occluded region 320 generally remains as an area for which the LIDAR sensor does not perceive information and is thus generally unaware of what may exist in the region 320.

Figure 4:
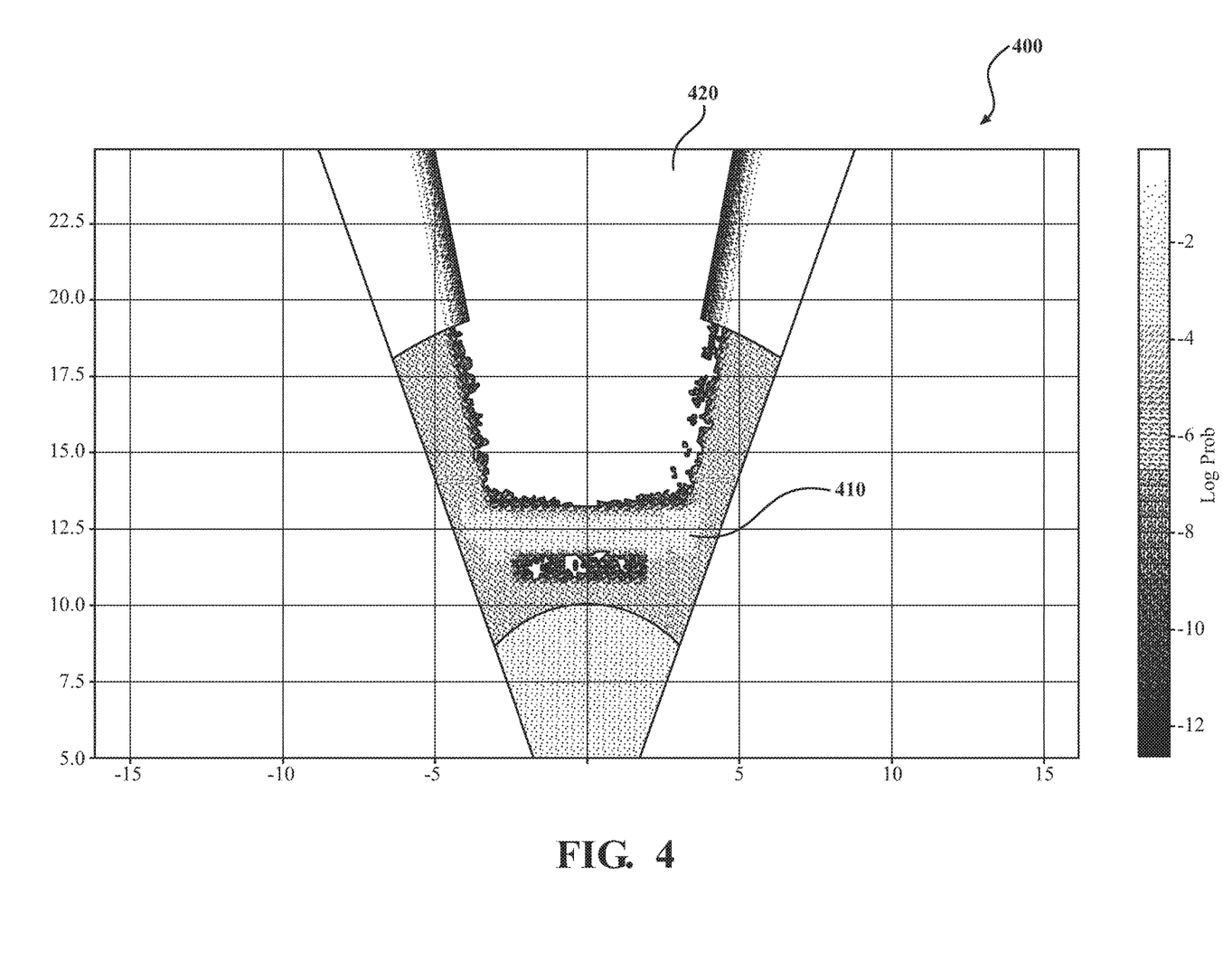

Moreover, an additional example of an observation model is provided in FIG. 4, which illustrates a model 400 for a rectangular shaped object 410. The rectangular shaped object 410, as in the case of the star-shaped object 310, is illustrated from a top-down view. In either case, when the object 410 is scanned by the LIDAR 124 from the angle illustrated in FIG. 4, an occluded region 420 results therefrom. It should be understood that the occluded region 420 is of a larger more significant size because of, for example, the shape of the object 410 itself but also because of the size of the object 410 in comparison to the object 310. Accordingly, in various implementations, the detection module 230 accounts for a size in addition to the class of the noted perceived object.

Thus, the object detection system 170 assigns a probability of the existence of an object of a particular class within the occluded region 320. For purposes of this example, consider that the detection module 230 generates a presence factor for a rectangle being behind the star within the occluded region 320. Since the rectangle may be large in comparison to the occluded region 320, the probability of the existence of the rectangle within the occluded region is determined to be, for example, low. In essence, the rectangle does not fit wholly within the occluded region 320 and would thus be perceived, at least in part, by the vehicle 100. Thus, the detection module 230, in one embodiment, generates the presence factor, as a function of the observation model 250, to indicate that the rectangle is unlikely to exist behind the star 310 and be completely occluded within the occluded region 320.

However, the detection module 230, in one embodiment, determines that the probability of a different class of object, such as a smaller circle, being present in the occluded region 320 is high in comparison to the rectangle, since the observation model 250 indicates that the circle is small enough to fit into the occluded region 320. Additionally, in one embodiment, the detection module 230 can leverage previous observations (e.g., at different times) for computing the probability. In this way, the object detection system 170 can provide more robust probability calculations and/or associate the calculations with previously detected dynamic objects moving through the environment.

As an applied example, consider that the star is instead a sport utility vehicle (SUV) or other vehicle while the rectangle is a semi-truck. Moreover, consider that the circle is actually a pedestrian. The object detection system may observe the SUV and assign a probability of a semi-truck and a pedestrian existing in the occluded area behind the SUV. Moreover, the object detection system may indicate that the probability of a semi-truck being located behind the SUV is small, but a pedestrian may be located in the occluded area. In this way, the object detection improves situational awareness about objects or probabilities of objects being present within the surrounding environment and can thus also improve functional aspects of the vehicle 100 such as path planning, collision avoidance, and other aspects relating to navigation through the environment.

Figure 5:
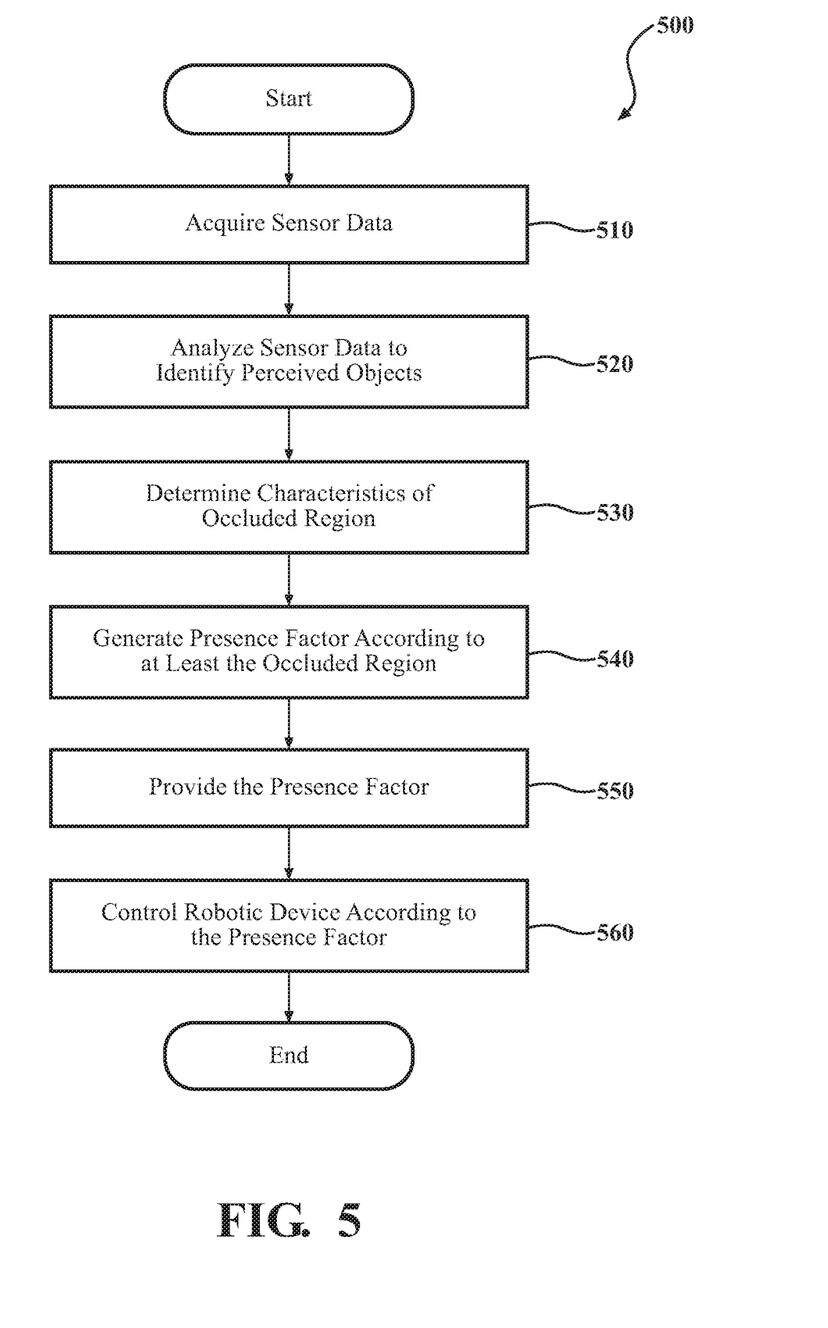
FIG. 5 illustrates one embodiment a method associated with detecting objects within occluded regions in a surrounding environment.

Additional aspects of predicting whether objects exist within occluded regions of perceived objects will be discussed in relation to FIG. 5. FIG. 5 illustrates a flowchart of a method 500 that is associated with detecting occluded objects in relation to perceived objects. Method 500 will be discussed from the perspective of the object detection system 170 of FIGS. 1, and 2. While method 500 is discussed in combination with the object detection system 170, it should be appreciated that the method 500 is not limited to being implemented within object detection system 170, but is instead one example of a system that may implement the method 500.

As a preliminary matter, it should be appreciated that the object detection system 170 is, in one embodiment, initially trained or otherwise configured with the observation model 250. The observation model 250 characterizes occluded regions that are cast by perceived objects and likelihoods of different classes of objects (e.g., vehicles, pedestrians, etc.) existing within the occluded regions while otherwise being undetected. In various implementations, the observation model 250 is implemented in different forms but is generally discussed within this disclosure as being a lookup table of histograms. However, in further aspects, the observation model 250 is a neural network or other machine learning algorithm that outputs the presence factor when, for example, provided with electronic inputs describing the occluded region.

At 510, the monitoring module 220 acquires sensor data from at least one sensor of the vehicle 100. In one embodiment, the monitoring module 220 collects the sensor data in real-time from a stream of sensor data provided by the vehicle sensor system 120. Accordingly, in one embodiment, the monitoring module 220 collects the sensor data from multiples ones of the sensors. In further embodiments, the monitoring module 220 acquires the sensor data from a select one of the sensors 120 such as the LIDAR sensor 124. In either case, the sensor data itself generally includes information about a surrounding environment of the vehicle 100 in which various aspects of the surrounding environment are captured/perceived.

At 520, the monitoring module 220 analyzes the sensor data to identify perceived objects embodied by the sensor data. In one embodiment, the monitoring module 220 applies image recognition techniques, LIDAR processing techniques (e.g., machine learning for point cloud recognition), and/or another approach to identify objects in the sensor data and discriminate between the objects. Thus, the monitoring module 220, for example, identifies aspects of the sensor data that correlate with separate objects and at least a class for the separate perceived objects. The class indicates, in one embodiment, a type of the perceived object that generally correlates with a profile in shape. That is, the class may indicate that the perceived object is a vehicle, pedestrian, etc. In further aspects, the class may also indicate general dimensions of the perceived object. Moreover, in further implementations, the class can indicate a 3D model of the perceived object that is derived from the sensor data. In either case, the monitoring module 220 analyzes the sensor data to extract perceived objects from the sensor data for further processing subsequently.

At 530, the detection module 230 determines characteristics of an occluded region that is cast by a perceived object. As previously indicated, the occluded region is generally an area that is blocked from being perceived by sensors of the vehicle 100. Thus, systems of the vehicle 100 are generally not aware of whether an object such as a pedestrian or another vehicle exists within the occluded region. Accordingly, the detection module 230, in one embodiment, provides inputs to the observation model 250 in the form of a class of the perceived object, and a relative location/pose in relation to the perceived object to determine the characteristics of the occluded region (e.g., shape, size, etc.). While the detection module 230 is disclosed as determining the characteristics of the occluded region prior to generating the presence factor, in one embodiment, the functions disclosed at blocks 530 and 540 may be combined into a single step.

At 540, the detection module 230 uses the observation model 250 to determine the presence factor. In general, the presence factor characterizes whether the occluded region cast by the perceived object is sufficient to obscure the occluded object. Thus, the presence factor indicates a likelihood of an occluded object existing in the occluded region associated with the perceived object. The detection module 230 generates the presence factor by, for example, using the observation model 250 as a lookup table. That is, the observation model 250, in one embodiment, is indexed according to various factors and produces the presence factor as an output. For example, the detection module 230 uses a pose, a class of the perceived object, and/or other aspects of the surrounding environment as an input to the observation model 250. In one embodiment, the observation model 250 includes different heuristics/models at different indexed locations that generate the presence factor. That is, the observation model 250 can be a collection of functions as previously defined that are indexed according to aspects of the perceived object and can be used to produce the presence factor according to the acquired sensor data and characteristics fo the perceived object.

In further aspects, the observation model 250 itself includes, in one embodiment, histograms associated with the various inputs that indicate the presence factors for various occluded objects or at least provide information that is further analyzed by the detection module 230 to produce the presence factor. As an additional matter, the detection module 230, in one embodiment, selects the occluded object or a set of possible occluded objects for which the presence factor is generated. That is, because different objects that may be occluded within the occluded region have varying shapes and sizes, the detection module 230 can select which occluded objects are used as a basis for the determining the presence factor.

For example, in one embodiment, the detection module 230 selects the occluded objects for analysis according to previously identified objects in the environment, objects that are likely within the surrounding environment as determined according to characteristics of the surrounding environment (E.g., school zone, highway, urban area, etc.), characteristics of the occluded region (e.g., shape and size), and so on. Thus, the occluded object can include a set of possible objects for which the presence factor is determined. In either case, the detection module 230 uses knowledge of the occluded region and generates the presence factor as a likelihood of whether one or more occluded objects exist within the occluded region.

At 550, the detection module 230 provides the presence factor as an output. In one embodiment, the detection module 230 generates an electronic output on one or more communication subsystems of the vehicle 100 to provide the presence factor to various systems 140. In general, the detection module 230 provides the presence factor as a percentage that indicates the likelihood of the presence of an object in general. In further aspects, the percentage may be specified separately for different classes of objects. In still further aspects, the detection module 230 may simply provide a binary indicator that specifies a general likelihood of a presence of an occluded object. In either case, the detection module 230 provides the presence factor as an electronic output, which is, for example, communicated to additional aspects of the vehicle 100 as subsequently discussed.

At 560, the detection module 230 controls one or more systems of the vehicle 100. In one embodiment, the detection module 230 controls the one or more systems 140 by communicating the presence factor to the one or more systems. For example, the detection module 230 communicates the presence factor to an autonomous driving module 160 to adjust path planning of the vehicle 100 to account for the occluded object according to the presence factor. That is, the detection module 230 can adjust how the vehicle 100 is autonomously controlled by providing additional information to the module 160 that affects situational awareness about the surrounding environment. Accordingly, the detection module 230 can cause the module 160 to change a path by informing the module 160 of the likely presence of an occluded object so that the vehicle 100 can improve avoiding collisions or other undesirable maneuvers in relation to the occluded object. Similarly, awareness of the absence of an occluded object can provide for maneuvering into a space that otherwise may be avoided. In general, the detection module 230 provides the presence factor to different systems to improve safety and general operation of the vehicle 100 as realized through improved awareness of the surrounding environment.

Figure 6:
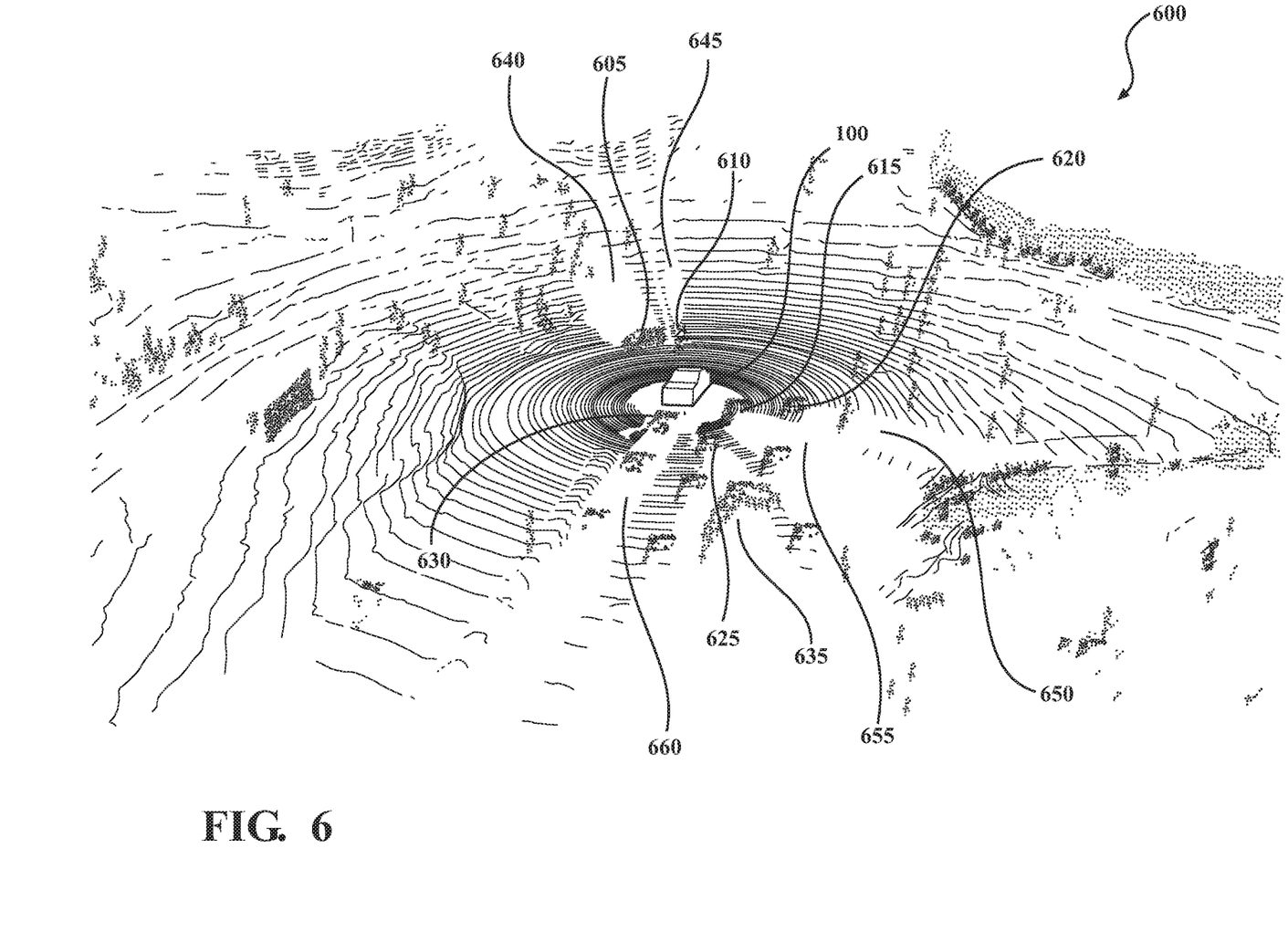
FIG. 6 illustrates an example LIDAR scan of a surrounding environment.

Further examples of how the object detection system 170 functions will be discussed in relation to FIG. 6. FIG. 6 illustrates an example surrounding environment 600 of the vehicle that includes a plurality of different objects. FIG. 6 is illustrated from the perspective of what is perceived by the vehicle 100 when using the LIDAR 124 to scan the surrounding environment 600. Thus, the plurality of concentric rings generally represent scan lines of the LIDAR 124, and thus sensor data that is acquired by the vehicle 100 through scans of the LIDAR 124. Moreover, the surrounding environment 600 is an intersection of two roads in an urban location with multiple different pedestrians, vehicles, and other aspects as will now be described.

The surrounding environment depicted in FIG. 6 includes perceived objects 605, 610, 615, 620, 625, and 630. The perceived objects 605, 615, 620, 625, and 630 are nearby vehicles whereas the perceived object 610 is a pedestrian. Object 635 is an occluded or at least partially occlude semi-truck as will be discussed further subsequently. In either case, the noted perceived objects cast occluded regions 640, 645, 650, 655, and 660 as indicated by an absence of scan lines from the LIDAR 124 return. As a further matter, not all of the objects in the surrounding environment 600 are labeled nor are all of the occluded regions. However, it should be appreciated that the disclosed methods still operate on these additional aspects but are not discussed for purposes of brevity.

Accordingly, the object detection system 170 acquires the sensor data, which depicts the surrounding environment 600 as illustrated. The monitoring module 220 executes one or more recognition techniques to identify and localize the perceived objects in the surrounding environment from the sensor data. Thereafter, the detection module 230 can determine characteristics of the occluded regions 640-660 and generate presence factors for the separate occluded regions using the observation model 250. As seen in FIG. 6, the occluded regions 640-660 are of varying sizes depending on a particular pose/orientation of a perceived object, a distance of a perceived object from the vehicle 100, and so on. Moreover, in various circumstances, two or more perceived objects can form a larger occluded region as seen with vehicles 615 and 625 casting an occluded region that occludes the truck 635. Accordingly, in further embodiments, the object detection system 170 can account for combined occluded regions cast by multiple objects. Additionally, the occluded region 660 illustrates a circumstance where multiple occluded objects are present within the occluded region 660 generated by the perceived object 630. Accordingly, the object detection system 170 may account for circumstances where multiple occluded objects are present in a single occluded region as learned through observations over time.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the object detection system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the object detection system 170, and/or the autonomous driving module(s) 160 may control some or all of these vehicle systems 140 and, thus, may be partially or fully autonomous.

The processor(s) 110, the object detection system 170, and/or the autonomous driving module(s) 160 can be operatively connected to communicate with the various vehicle systems 140 and/or individual components thereof. For example, returning to FIG. 1, the processor(s) 110, the object detection system 170, and/or the autonomous driving module(s) 160 can be in communication to send and/or receive information from the various vehicle systems 140 to control the movement, speed, maneuvering, heading, direction, etc. of the vehicle 100. The processor(s) 110, the object detection system 170, and/or the autonomous driving module(s) 160 may control some or all of these vehicle systems 140.

The processor(s) 110, the object detection system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the object detection system 170, and/or the autonomous driving module(s) 160 can control the direction and/or speed of the vehicle 100. The processor(s) 110, the object detection system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the object detection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the observation model 250 as implemented by the detection module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An object detection system for predicting a presence of occluded objects from a robotic device, comprising:
one or more processors;
a memory communicably coupled to the one or more processors and storing:
a monitoring module including instructions that when executed by the one or more processors cause the one or more processors to, in response to acquiring sensor data about a surrounding environment, analyze the sensor data to identify a perceived object in the surrounding environment by determining at least a class of the perceived object; and
a detection module including instructions that when executed by the one or more processors cause the one or more processors to determine a presence factor associated with the perceived object according to an observation model, wherein the presence factor indicates a likelihood of an occluded object existing in an occluded region associated with the perceived object, wherein the detection module includes instructions to determine the presence factor according to the observation model including instructions to use the class of the perceived object as an input to a lookup table of the observation model to produce the presence factor, and
wherein the detection module includes instructions to control one or more systems of the robotic device according to the presence factor.

2. The object detection system of claim 1, wherein the detection module includes instructions to determine the presence factor including instructions to determine a size and a shape of the occluded region resulting from the perceived object.

3. The object detection system of claim 2,
wherein the lookup table correlates the class of the perceived object and a relative position of the robotic device in relation to the perceived object with the presence factor.

4. The object detection system of claim 1, wherein the occluded region is an area that is blocked by the perceived object from being directly perceived by a sensor of the robotic device and in which the occluded object can exist while being obscured from the sensor, and
wherein the observation model identifies aspects of the occluded region in relation to the perceived object.

5. The object detection system of claim 1, wherein the class indicates at least a type of the perceived object that correlates with a profile in shape for the perceived object, wherein the detection module includes instructions to determine the presence factor to characterize whether the occluded region cast by the perceived object is sufficient to obscure the occluded object, and
    wherein the detection module includes instructions to select the occluded object from a set of objects that are likely present in the surrounding environment and has a shape and a size that substantially fits within the occluded region.

6. The object detection system of claim 1, wherein the monitoring module includes instructions to acquire the sensor data including instructions to collect, using at least one sensor of the robotic device, the sensor data about the surrounding environment.

7. The object detection system of claim 1, wherein the detection module includes instructions to control the one or more systems including instructions to control an autonomous driving module to plan a path of the robotic device to account for the occluded object according to the presence factor.

8. The object detection system of claim 1, wherein the robotic device is a vehicle.

9. A non-transitory computer-readable medium for predicting a presence of occluded objects from a robotic device and comprising instructions that when executed by one or more processors cause the one or more processors to:
    in response to acquiring sensor data about a surrounding environment, analyze the sensor data to identify a perceived object in the surrounding environment by determining at least a class of the perceived object;
    determine a presence factor associated with the perceived object according to an observation model, wherein the presence factor indicates a likelihood of an occluded object existing in an occluded region associated with the perceived object, wherein the instructions to determine the presence factor include instructions to use the class of the perceived object as an input to a lookup table of the observation model to produce the presence factor; and
    control one or more systems of the robotic device according to the presence factor.

10. The non-transitory computer-readable medium of claim 9, wherein the instructions to determine the presence factor include instructions to determine a size and a shape of the occluded region resulting from the perceived object.

11. The non-transitory computer-readable medium of claim 9, wherein the occluded region is an area that is blocked by the perceived object from being directly perceived by a sensor of the robotic device and in which the occluded object can exist while being obscured from the sensor, and
    wherein the observation model identifies aspects of the occluded region in relation to the perceived object.

12. The non-transitory computer-readable medium of claim 9, wherein the class indicates at least a type of the perceived object that correlates with a profile in shape for the perceived object, wherein the instructions to determine the presence factor characterizes whether the occluded region cast by the perceived object is sufficient to obscure the occluded object, and
    wherein the instructions further include instructions to select the occluded object from a set of objects that are likely present in the surrounding environment and has a shape and a size that substantially fits within the occluded region.

13. The non-transitory computer-readable medium of claim 9, wherein the instructions to control the one or more systems include instructions to control an autonomous driving module to plan a path of the robotic device to account for the occluded object according to the presence factor.

14. A method of predicting a presence of occluded objects from a robotic device, comprising:
    in response to acquiring sensor data about a surrounding environment, analyzing the sensor data to identify a perceived object in the surrounding environment by determining at least a class of the perceived object;
    determining a presence factor associated with the perceived object according to an observation model, wherein the presence factor indicates a likelihood of an occluded object existing in an occluded region associated with the perceived object, wherein determining the presence factor according to the observation model includes using the class of the perceived object as an input to a lookup table of the observation model to produce the presence factor; and
    controlling one or more systems of the robotic device according to the presence factor.

15. The method of claim 14, wherein determining the presence factor includes determining a size and a shape of the occluded region resulting from the perceived object.

16. The method of claim 15,
    wherein the lookup table correlates the class of the perceived object and a relative position of the robotic device in relation to the perceived object with the presence factor.

17. The method of claim 14, wherein the occluded region is an area that is blocked by the perceived object from being directly perceived by a sensor of the robotic device and in which the occluded object can exist while being obscured from the sensor.

18. The method of claim 14, wherein the robotic device is a vehicle, and wherein controlling the one or more systems includes controlling an autonomous driving module to plan a path of the vehicle to account for the occluded object according to the presence factor.

19. The method of claim 14, wherein the class indicates at least a type of the perceived object that correlates with a profile in shape for the perceived object, wherein determining the presence factor characterizes whether the occluded region cast by the perceived object is sufficient to obscure the occluded object, and
    wherein the occluded object is selected from a set of objects that are likely present in the surrounding environment and has a shape and a size that substantially fits within the occluded region.

20. The method of claim 14, wherein acquiring the sensor data includes collecting, using at least one sensor of the robotic device, the sensor data about the surrounding environment.

* * * * *